Figure 7:
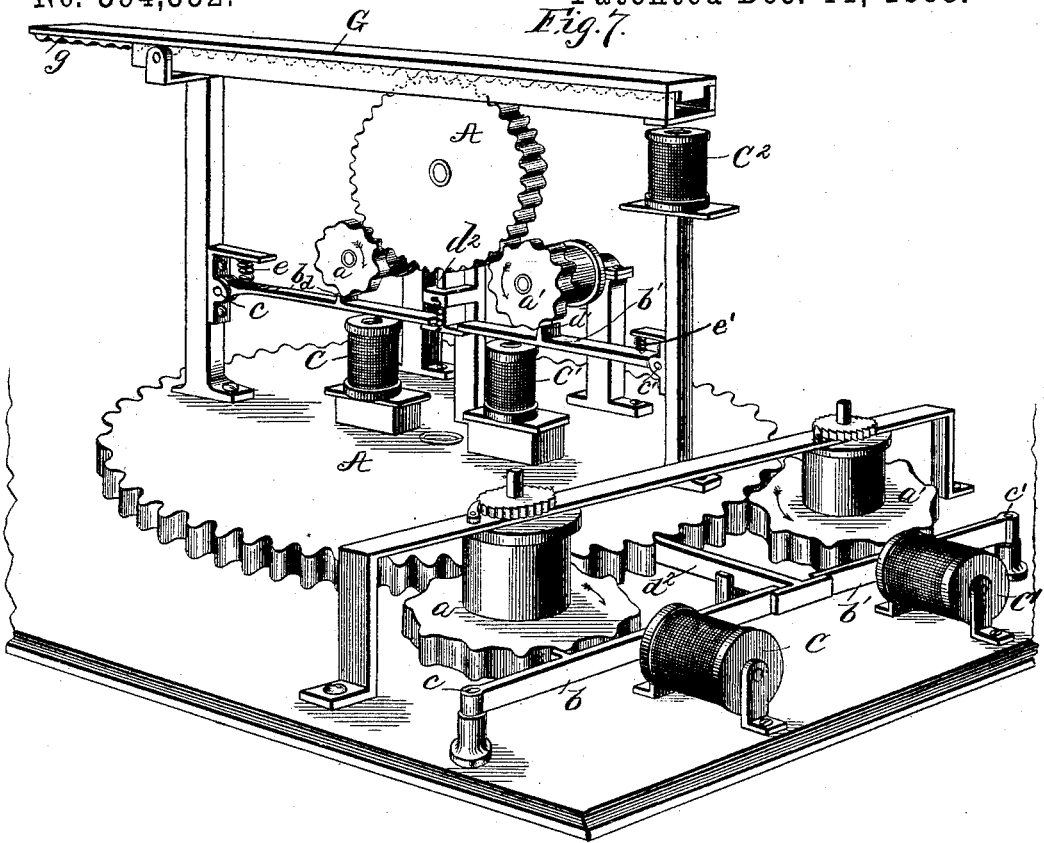

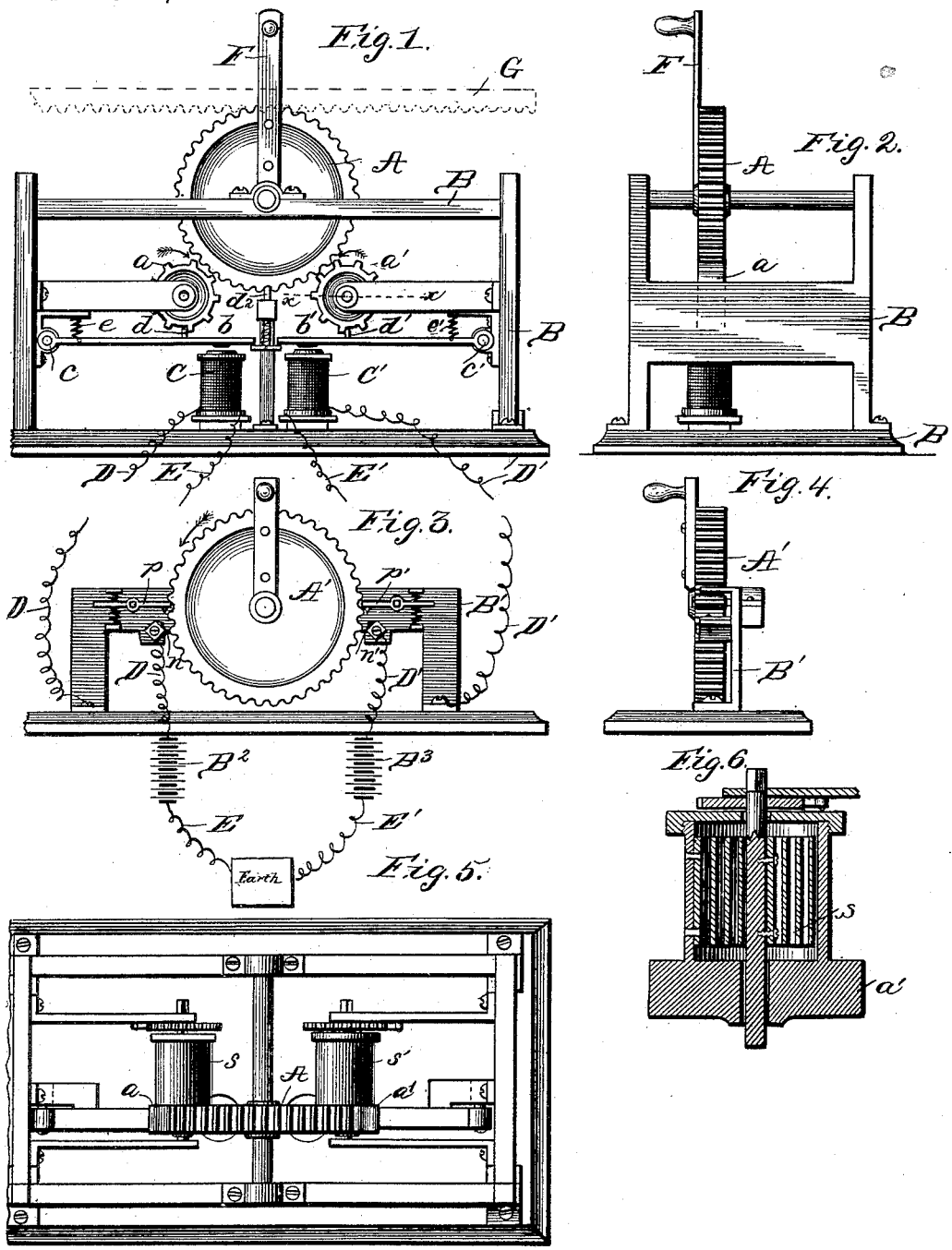

(No Model.) 2 Sheets—Sheet 2.

B. CADWALLADER.
ELECTRO MECHANICAL MOVEMENT.

No. 394,332. Patented Dec. 11, 1888.

Witnesses:
V. Rosseter
Jno. H. Whipple

Inventor
Bassett Cadwallader
By Merriam & Whipple
Attys

UNITED STATES PATENT OFFICE.

BASSETT CADWALLADER, OF CHICAGO, ILLINOIS, ASSIGNOR TO THE INTER OCEAN ELECTRIC COMPANY, OF SAME PLACE.

ELECTRO-MECHANICAL MOVEMENT.

SPECIFICATION forming part of Letters Patent No. 394,332, dated December 11, 1888.

Application filed August 26, 1886. Serial No. 211,935. (No model.)

*To all whom it may concern:*

Be it known that I, BASSETT CADWALLADER, of Chicago, Illinois, have invented certain new and useful Improvements in Electro-Mechanical Movements, of which the following is a specification.

My invention relates to devices for controlling or causing mechanical movements by electricity or the power of electro-magnets. The chief object is to provide means whereby the power required to operate any machine or mechanism in two directions may be determined by a transmitting device in electrical connection with the circuit embracing such machine or mechanism, to set said machine or mechanism in motion either forward or backward, starting it from any point or condition in which it may be at rest, and continuing such motion for any desired period of time, or stopping it at any desired point of its progress and again starting and continuing it in the same direction, or reversing and continuing the latter motion for any desired period or length of motion; in short, producing a backward-and-forward motion of any required extent, regular or variable, subject at any time to change of direction by changing the motion of the transmitting device. By this means it is obvious that I can cause the motion of the mechanism to be operated to follow the motion in either direction of the operating mechanism to any extent within the limits of capacity of the apparatus; and my mechanism, therefore, differs from many prior mechanisms in the art, in that by it an advancing or retrogade motion of the mechanism to be operated can be caused by the operation of electromotors through a succession of motions of equal and determined length, which motions follow the making and breaking of the operating circuit or circuits, as said impulses are occasioned by the movement of the transmitting device in either direction. I attain this object by means of two elements in the electrical mechanism used, determining the direction in which the mechanism is to be operated, arranged to act independently of and in opposite directions from each other, the one determining the power applied to propel the mechanism forward and the other determining the power applied to propel it backward. These elements are also made to divide the forward and the backward motions of the machine which is to be operated into small units of distance, consisting of any arbitrary length—say from one one-hundredth part to one-quarter of an inch, or even less or more, if desired—so that each element may be made to determine how far the motion shall extend or be continued in the direction of its action in any given case. These elements may consist of any one of several well-known mechanical appliances, set in motion by electricity, which might be suggested; but the one hereinafter described seems to be well adapted for the purpose.

The invention consists in the mechanism for accomplishing these results and in such other minor features and combinations as are hereinafter described and claimed.

The accompanying drawings illustrate the invention.

Figure 8:
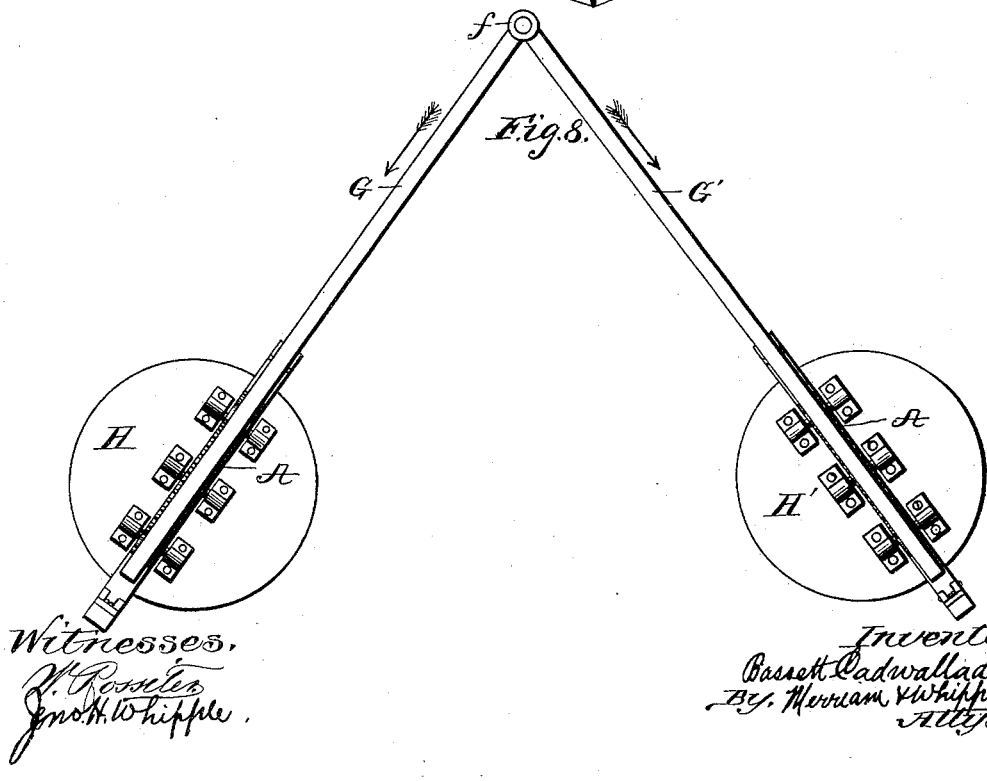

Figure 1 is a side elevation of a receiving-instrument containing my invention. Fig. 2 is an end elevation of Fig 1. Fig. 3 is a side elevation of a sending-instrument. Fig. 4 is an end elevation of Fig. 3. Fig. 5 is a plan view of the receiving-instrument shown in Fig. 1. Fig. 6 is an enlarged horizontal section through a spring-box, taken on line $x\ x$ of Fig. 1. Fig. 7 is a perspective view of a machine containing a duplication of the parts shown in Fig. 1, in combination, for producing a resultant motion from circular and straight reciprocating motion. It is plain, however, that for limited arcs of considerable radius the resultant of such straight and circular motions will not vary materially from the resultants of two straight motions. Fig. 8 is a plan view of a machine containing a duplication of the parts shown in Fig. 1, with others in combination, for producing a resultant motion from two straight reciprocating motions.

A designates a cog or toothed wheel supported on a shaft journaled in a suitable frame, as B. Two motor-wheels, $a\ a'$, are also supported on shafts suitably journaled in the frame and arranged to be operated by springs $s\ s'$ or other motive power.

C C' are electro-magnets operated by wires D D', with ground-wires E E' and controlling lever-armatures $b\ b'$, which are pivoted on the frame at $c\ c'$ and have lugs $d\ d'$ and retractile springs $e\ e'$.

The wheel A may be provided with an automatic stop, as a spring catch or pawl, $d^2$. The connection of the motors $a\ a'$ with wheel A is such that the wheel A may be rotated by either one of the motors $a\ a'$ without interference or engagement of the other—that is, if the wheel $a$ be rotated in the direction of the arrow it will engage with the wheel A and turn it round and round as long as the wheel $a$ continues in operation, while the wheel $a'$ will remain at rest out of engagement therewith; and a reverse movement of the wheel A is effected in the same manner by the rotation of the wheel $a'$ in a reverse direction, indicated by the arrow. This general result in this case is effected by spacing the cogs on the small wheels different from those on the large one. Each cog of either small wheel, when the wheel is in operation, moves out of engagement with the cogs of the large wheel before its next succeeding cog comes into engagement, and the large wheel may then stop until the next succeeding cog on the small one is brought into engagement with it, which is done by the continuing rotation of the small wheel. The wheels thus connected are placed under the control of electro-magnets C C' and through the armatures $b\ b'$ and spring-ratchet connections $d\ d'\ d^2$, the arrangement being such that when the current is put onto one side, as C, the armature $b$ will be drawn down and release the ratchets $d\ d^2$ to start the mechanism in motion in one direction; and when the current is shut off or broken the armature will be released and the spring-ratchets will operate to stop the mechanism; and when the current is put onto the other side, as C', the reverse movement will be effected through armature $b'$ and spring-ratchets $d'\ d^2$, the T-head of $d^2$ being made to engage with both the armatures.

The ratchet $d^2$ is not a necessary element in all cases, as in an ordinary motor, where absolute precision in the division of unit distances is not required.

The wheel $a$, with electro-magnet C and armature-connection, represents one form of one of the two elements above referred to, and the wheel $a'$, with electro-magnet C' and armature-connection, the other in like form.

The distance which the wheel A would be moved by releasing either of the ratchets $d\ d'$ from a tooth on either of the wheels $a\ a'$ and causing it to engage with the next succeeding tooth would represent what I mean by a unit of distance. A single impulse sent over either of the wires D or D' would effect such movement through a single unit of distance and cause the mechanism to stop at the end of the same, and a succession of electrical impulses given through either of said wires would cause the mechanism to be moved in the direction in which it was given and to the end of the succession, where the mechanism would be stopped, thus effecting a movement in either direction desired and through the space covered by any desired number of the units of distance. It is thus seen that the mechanism may be stopped between any two units of distance, and from such stopping-point moved either backward or forward in a succession of revolutions or for any number of units less than a whole revolution.

A' designates a wheel in a circuit closing and breaking or sending instrument. This wheel is supported on a shaft journaled in a suitable frame, as B'. It is provided with teeth which engage with two spring-pawls, $p\ p'$, which are connected in the circuits.

$B^2\ B^3$ are batteries, with which wires D E are connected upon one side and D' E' upon the other through the earth in the usual manner in forming electrical circuits. The circuit D E is normally open at $n$ and the circuit D' E' at $n'$. By turning the wheel A' in the direction of the arrow the pawl $p$ is turned down and closes the circuit at $n$, the teeth of the wheel passing the pawl and releasing it the instant the connection is made, so that a continued rotation of the wheel in this direction would cause a successive closing and opening of the circuit, sending a succession of electrical impulses over wire D and causing the wheel A to move in the same direction through the same distance traveled by A'. It will be seen that the circuit-breaking device shown causes a succession of makes and breaks in an electric circuit proportional to its movement in two directions. Turning the wheel A' in the reverse direction from that indicated by the arrow causes the circuit D' E' to be closed and opened successively, and produces a reverse movement of the wheel A in the same manner. The motion of the wheel A, thus controlled, may be imparted to any machine or mechanism by means of an arm, as F, to be oscillated or rotated as a crank, or by means of a rack, as G, to produce straight reciprocating motion, or any other connection either with the wheel or its shaft to produce rotary motion.

I do not wish to be understood as intending to limit myself to the particular mechanism described as representing the two elements mentioned for reducing distance to units, nor to the particular arrangement thereof shown, as a variety of well-known mechanisms differently arranged can readily be adapted to work on the same principle and produce the same results; and I have shown only a simple form of circuit closing and breaking mechanism; but any other suitable form—such as a key-board circuit-breaker—may be adapted thereto.

In Fig. 7 a duplication of the parts shown in Fig. 1 is represented in combination, one set of the wheels A $a\ a'$ being supported in a horizontal position and another set, $A^2\ a^2\ a^3$, being mounted thereon and supported in a vertical position. The wires are not shown, but assumed to be the same as ordinarily employed to form electrical circuits. By means of motion imparted to the horizontal wheel A, either forward or backward, the end $g$ of the rack-bar G is caused to describe a circle or the arc of a circle, and by means of like motion imparted to the vertical wheel $A^2$ straight reciprocating motion is imparted to said rack-bar G, and by means of the synchronous movements of the two any of their resultant motions may be produced. An electro-magnet, as $C^2$, may be employed in this combination for producing simple vibratory motion of the end $g$ of the bar in a third direction, so that the resultant of the three motions would be obtained, and in the event of the resultant motions of the bar produced by the horizontal and vertical wheels being used to propel a pen or pencil in writing, or operating a type-writer, this third motion could be utilized to lift the pen from the paper between words or to raise the key-striking device while passing from one key to another; and if desired, three of the elements represented by the vertical and horizontal wheels $A^2$ $a^2$ $a^3$ A $a$ $a'$ may be combined, two being used, as shown in Fig. 7, and the third arranged to take the place of the electro-magnet $C^2$, to give a varied vertical movement to the end $g$ of the ratchet-bar.

Fig. 8 shows a combination for producing a resultant motion of two rack-bars, as G G', hinged together at $f$. The elements controlling the motion of G forward and back, which are the same as before shown, are mounted on the pivoted table H and like elements controlling G' on pivoted table H'. If G is caused to move in the direction of the arrow, the end $f$ will describe an arc of a circle whose center is in the pivoted table H', which, together with table H, turns in accommodation to the new position. If G' is moved in the direction of its arrow, $f$ describes the arc of a circle having its center in table H, and the tables turn to accommodate the arms to the shifting position of $f$. Reversed movements of G G' produce corresponding reversed results. A combined movement of G G' will produce the corresponding resultant motion of $f$, while H H' will be adapted to every changing position.

It is obvious that electro-magnets, as C C', may be employed for the purpose of restraining and releasing any local motive power which may be employed in operating a machine, or for the purpose of furnishing the power direct by which the machine is to be operated.

I contemplate the employment of any feasible multiplex or "step-by-step" system for transmitting two or more currents or impulses over one wire at the same or nearly the same time for operating the two elements together in a single machine or one embracing the compound motions. I also contemplate the employment in the sending-instrument of the same elements for dividing the movements thereof into small units of distance, so that the exact motions of an arm or lever of the sending-instrument shall be reproduced in the receiver. This of course can be carried into combinations embracing the same number of these elements in both the sending and the receiving instrument for producing in each the various resultant motions, as previously illustrated, thus enabling either instrument to be used as a sending or a receiving instrument.

It will be seen that if a machine be constructed of a group of various reciprocating devices arranged in combination, so as to produce by the synchronous movement of all or a part of the members of the group the various resultant motions, and having each member under the control of two independent electrical forces arranged to act in opposite directions and the group of forces under control, so that any one of the sources of power might be called into action or released from action, or any two or more of them might be called into action simultaneously or successively and likewise released from action, such machine might be operated by an adaptation of the means herein described, and could be made to imitate or reproduce all the movements of a man's arm and hand—as, for instance, in the act of writing.

Having thus fully described my invention, what I claim, and desire to secure, broadly, by Letters Patent, is—

1. The combination of a wheel and two independent motors for alternately propelling said wheel in opposite directions through an indefinite number of units of distance, with two electro-magnets arranged to release or check the propelling-motors alternately at the end of each unit of distance.

2. The combination of two electro-mechanical motors arranged to act independently of each other in opposite directions, with a machine whose moving parts are adapted to move in opposite directions through one or any indefinite number of units of distance at the will of the operator, and an electric circuit passing through each of said electric mechanical motors, and a circuit-breaker for causing electric impulses corresponding in number to said units of motion to traverse said circuits at the will of the operator, substantially as described.

3. The combination, in an electro-mechanical motor, of the following elements, namely: first, mechanism for producing rotary or reciprocating motion; second, mechanism for dividing both the advancing and the receding motion into corresponding units of distance, and, third, two electro-magnets, one determining the operation of the mechanism for dividing the forward motion into units, and the other determining the operation of the mechanism for dividing the backward motion into units, substantially as specified.

4. The combination, in an electro-mechanical motor, of the following elements, namely: first, mechanism for producing rotary or reciprocating motion; second, mechanism for dividing the opposite movements into corresponding units of distance; third, means for checking the motion at the end of each unit of distance in either direction, and, fourth, two electro-magnets, one to govern the mechanism for dividing the motion in one direction into units and the other to govern the mechanism for dividing the motion in the opposite direction into corresponding units.

5. The combination of a sending-instrument provided with circuit making and breaking mechanism operated by the motion of the sending-instrument in two directions, with a receiving-instrument provided with two magnets, one of which operates the receiving-instrument in one direction and the other of which operates the receiving-instrument in another direction by determined units of motion corresponding to the number of electric impulses transmitted to them from the sending-instrument, substantially as described.

6. The combination of a sending-instrument having a circuit closing and breaking mechanism for its forward motion and an independent circuit closing and breaking mechanism for its backward motion, with a receiving-instrument provided with mechanism for dividing its forward movement into units of distance, and independent mechanism for dividing its backward movement into corresponding units of distance, and two electric circuits for vitalizing said opposite independent mechanisms, substantially as and for the purpose specified.

7. A receiving-instrument consisting of a toothed wheel, as A, wheels, as $a\ a'$, and electro-magnets, as C C', and armature-connections, in combination with a sending-instrument consisting of a toothed wheel, as A', pawl $p\ p'$, and electric circuits D E and D' E', as and for the purpose specified.

8. The combination of a set of toothed wheels, as $A^2\ a^2\ a^3$, pivotally supported in a given plane, as horizontal, and another set of wheels, as $A\ a\ a'$, mounted and supported on the first-named set in a plane perpendicular thereto, and their respective electro mechanisms, as and for the purpose specified.

9. The combination of a set of wheels, as A $a\ a'$, pivotally supported in a given plane, and another set of wheels, as $A^2\ a^2\ a^3$, mounted and supported on the first-named set in a plane perpendicular thereto, a bar, as G, and electro-magnets, as C C', C C', and $C^2$, as and for the purpose specified.

10. The combination of a toothed wheel, as A, and a toothed wheel, as $a$, the teeth of said wheels being so differently spaced as to permit rotation of the wheel A in the spaces between the teeth of wheel $a$ without engagement with said teeth.

11. The combination of two bars, as G G', hinged together, as at $f$, and mounted on wheels, as A A, for imparting to said bars straight reciprocating motion, the wheels A A being mounted on pivotal supports, as H H', as and for the purpose specified.

12. An electro-mechanism having two operating electro-mechanical devices arranged to act independently of and in opposite directions to each other, a step-by-step device connected with each of said electro-mechanical devices, and a rod operated in both directions by said electro-mechanical devices a distance or distances in proportion to the number of electrical impulses transmitted to said electro-mechanical devices, and a transmitting device causing electric impulses to be transmitted to either of said electro-mechanical devices, depending upon the direction of its motion.

13. The combination of a wheel, as A, with two motors, as $a\ a'$, arranged to apply motive power alternately in opposite directions without the interference of the one with the other, electro-magnet and armature mechanisms, as C $b$ C' $b'$, for releasing and checking said motor, as and for the purpose specified.

14. The combination of a receiving-instrument consisting of a wheel, as A, in connection with two motors arranged to apply motive power alternately in opposite directions without interference with each other, and electro-magnet and armature mechanisms for releasing and checking said motors, substantially as described, and a sending-instrument consisting of a wheel, as A', provided with two independent circuit closing and breaking mechanisms arranged to be operated by the alternate movements of said wheel, as and for the purpose specified.

15. The combination of a machine provided with an arm adapted to be reciprocated in opposite directions, means for dividing each of said opposite movements into units of distance, two independent electro-magnets, one connected to propel the arm indefinitely forward, and the other connected to propel the same indefinitely backward, and a step-by-step mechanism operated by the magnet and moving the arm, so as to cause said arm to move through one unit of distance in either direction for each electric impulse received through its corresponding magnet, and a transmitting device for transmitting said impulses at will to either magnet, dependent upon the direction of motion of the transmitting device, substantially as described.

16. The combination, in an electro-magnetic receiving-instrument, of two electro-magnetic motors, each operating a movable part in a linear direction by a step-by-step motion in two directions, the lines of linear motion of said parts being at an angle to each other, and a connection from each of said parts to the point of intersection of their directions of resultant motion, where said connections are connected to each other, or to a body to be moved in a direction resulting from the combined motions of said two connections to such moving body, substantially as described.

17. The combination of two bars pivoted to each other at an angle, two electro-magnetic motors driving said bars in opposite directions by a step-by-step motion, and two pivots enabling said connecting-bars to swing at an angle to their linear motion, whereby the pivotal connection of said bars follows the resultant motion of the two electromotors, substantially as described.

18. The combination of a wheel adapted to be rotated in both directions, two independent electromotors connected with said wheel, one for propelling said wheel forward and the other for propelling said wheel backward by a step-by-step motion, and a transmitting device operating each of said electromotors by a series of independent electric impulses transmitted by the sending mechanism to either of said electromotors at will, whereby the units of motion of said wheel in either direction are dependent upon the number of electrical impulses transmitted to the electromotor which moves it in that direction, substantially as described.

19. The combination of a bar whose operative end is capable of three motions, two in the same plane and the other substantially perpendicular to said plane, two electromotors for operating the end of said bar in a linear direction and in a second direction at an angle to said first direction, and a third electro-magnet for removing the operative end of said bar from said plane of original motion, substantially as described.

BASSETT CADWALLADER.

Witnesses:
 JNO. H. WHIPPLE,
 J. R. DEAN.